(No Model.)
R. M. KEATING.
BALL BEARING RETAINING DEVICE.
No. 581,730. Patented May 4, 1897.
Fig. 1
Fig. 5
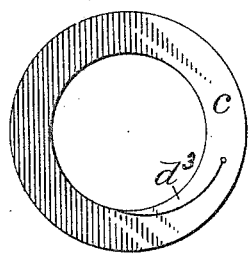
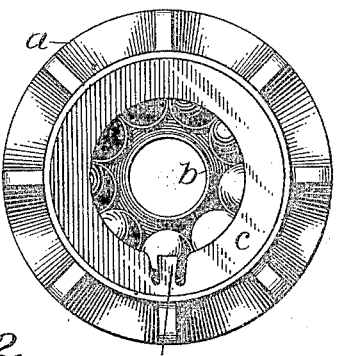
Fig. 6
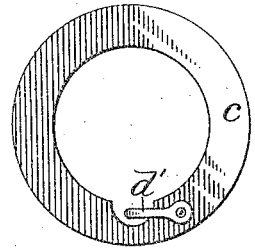
Fig. 2
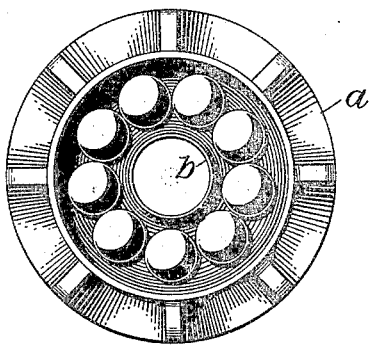
Fig. 3. Fig. 4.
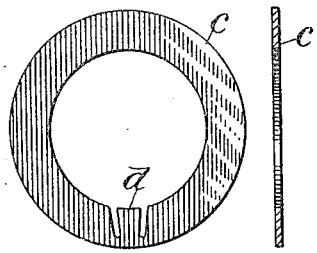
Fig. 7
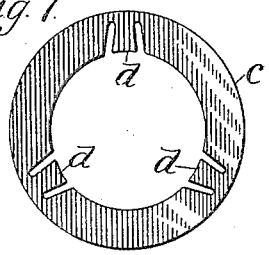
Fig. 9.
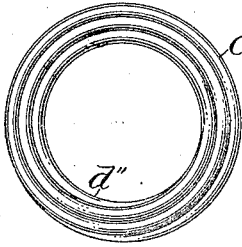
Fig. 10.
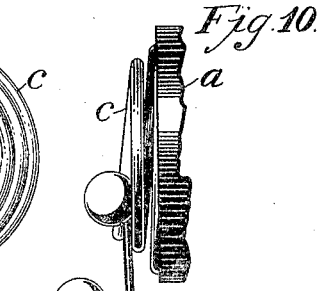
Fig. 8.
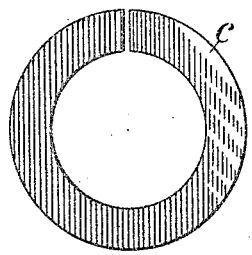
Witnesses
L. H. Horner.
E. C. Stickney.
Inventor
Robert M. Keating
By Allen Webster
Attorney

United States Patent Office.

ROBERT M. KEATING, OF SPRINGFIELD, MASSACHUSETTS.

BALL-BEARING-RETAINING DEVICE.

SPECIFICATION forming part of Letters Patent No. 581,730, dated May 4, 1897.

Application filed May 23, 1896. Serial No. 592,724. (No model.)

*To all whom it may concern:*

Be it known that I, ROBERT M. KEATING, a citizen of the United States of America, residing in Springfield, in the county of Hampden and State of Massachusetts, have invented new and useful Improvements in Ball-Retaining Devices for Ball-Bearings, of which the following is a specification, reference being had to the accompanying drawings, and letters of reference marked thereon.

The object of my invention is to provide an improved device for retaining the balls of ball-bearings in position, especially with reference to wheels for bicycles and other wheel-vehicles, wherein it is desirable to clean the parts without removing the balls and wherein the balls may be easily removed when desired, and generally for any ball-bearing where the device may be applicable.

My object is, further, to provide a simple means for retaining the balls in position, so that the operative portion of a bearing may be separated and reassembled without danger of the balls being lost, and so constructed that a part may be sprung up or bent slightly and sufficient room provided to allow the balls to be removed and to be returned through the same channel.

I accomplish the objects of my invention by the employment of a ring having a part capable of being moved from its normal position to allow the passage of the balls.

In the accompanying drawings, in which like letters of reference indicate like parts, Figure 1 is an end view of a bicycle-wheel hub, showing the balls in the ball-case and showing my retaining-ring applied thereto. Fig. 2 is a like view with the retaining-ring removed. Figs. 3 and 4 are side and edge views of a ring detached from the hub. Fig. 5 is a side view of a ring illustrating a modification in the shape of the part adapted to be bent or sprung up. Fig. 6 is a like view illustrating a modification wherein a latch covers an opening. Fig. 7 is a like view illustrating another modification wherein three tongues or parts are provided, any one of which may be bent or sprung up to provide room for the passage of the balls. Fig. 8 is a like view illustrating another modification wherein one end of the body of the ring may be moved sufficiently to allow the balls to pass; and Figs. 9 and 10 are side and edge views, respectively, illustrating a modification wherein the holding-ring consists of a flat helix.

In detail, $a$ indicates the hub; $b$, the ball-case; $c$, the body of the ball-retaining ring, and $d$ the part of the ring adapted to be turned or sprung up.

The construction of my device will be readily understood on reference to the drawings, wherein I illustrate a ring preferably made of thin sheet metal resting within the inner edge of the ball case or receptacle in the hub and having the central portion cut away sufficiently to permit the insertion of the other part of the ball-bearing, so that the bearing-surface for the balls will come to its proper position without being interfered with by the ball-retaining ring, the ring being only of sufficient width to just prevent the passage of the balls between the edge of the ring and the edge of the ball-holding case or receptacle.

At one or more places in the ring I provide an opening, which opening is closed or partially closed by a projecting tongue, which tongue is preferably formed integral with the body of the ring. This ring may be made of thin sheet metal or it may be of spring metal annealed.

In order to remove the balls, it simply becomes necessary to spring or bend the tongue $d$ outwardly a trifling distance sufficiently to provide a passage-way for a single ball between the upturned edge of the tongue and the inner edge of the ball-case, when it will readily be seen the balls may all be removed one after the other, and after being suitably cleaned they may be returned to place through the same opening, and if the device is made of annealed or soft metal it simply becomes necessary to bend the tongue back to its normal position and the balls will thereafter be retained in place until the tongue be again moved, as before described.

To provide against the possibility of a single tongue being bent so great a number of times as to cause fracture, I show in Fig. 7 a ring provided with three tongues, which may be used alternately, and thus danger of a tongue being broken by being continually bent will be largely avoided.

In Fig. 5 I illustrate a construction wherein the tongue $d^3$, while being, as before described, integral with the ring, its shape differs in that instead of its being formed by a cut at each side the cut starts at a point in the inner edge of the ring and gradually approaches the exterior edge until a sufficient width of tongue is provided, so that upon being bent up it will leave an opening sufficient for the passage of the balls.

In Fig. 6 I show a tongue $d'$, formed separate and attached to the ring, the end portion of the tongue arranged to project over an opening in the ring.

In Fig. 8 I illustrate a construction wherein instead of the tongue being cut out of or attached to the body I form the ring of a single piece, the ends, however, not being united, and while the bulk of the body of the ring will be held in position by its natural tendency to spring open either end may be forced outwardly a sufficient distance to permit the balls to pass.

In Figs. 9 and 10 I illustrate a construction wherein the holding-ring is made of a continuous piece formed in a flat helix, the inner convolutions of which may be sprung outwardly, as illustrated in Fig. 10, so as to free the balls.

Having therefore described my invention, what I claim, and desire to secure by Letters Patent, is—

1. In combination with a ball-bearing hub, an independent ball-retaining ring fixed in the hub at one side of the ball-channel and having a movable part adapted to be moved to allow of the passage of the balls while the major portion of the ring remains in position in the hub, substantially as shown.

2. The combination with a ball-bearing hub, of a ball-retaining ring fixed in the hub and having a part adapted to be bent or sprung from its normal position to permit the passage of the balls, substantially as and for the purposes stated.

3. The combination with a ball-bearing hub, of a ball-retaining ring having a tongue formed integral therewith, and covering a portion of the channel, and adapted to be moved from its normal position to permit the removal of the balls, substantially as shown.

4. The combination with a ball-bearing hub having a ball-channel open at one side, of a ball-retaining ring fixed in the hub at the open side only of the ball-channel and extending toward the center of the hub to close the channel sufficiently to prevent removal of the balls, and having an opening for the passage of the balls laterally through it, and a tongue to close said opening, substantially as and for the purposes stated.

5. The combination of a hub, a ball-cup fixed therein, a ring fixed in the opening in the hub adjacent to the open side of the ball-cup, to cover the balls sufficiently to prevent escape and with a part adapted to be moved without displacing the ring-body, whereby a passage is provided for the balls, substantially as shown.

ROBERT M. KEATING.

Witnesses:
ALLEN WEBSTER,
P. B. PHELAN.